(12) United States Patent
Leonard et al.

(10) Patent No.: US 8,060,747 B1
(45) Date of Patent: Nov. 15, 2011

(54) DIGITAL SIGNATURES FOR EMBEDDED CODE

(75) Inventors: Arthur C. Leonard, Redmond, WA (US); Daniel M. Cheung, Redmond, WA (US); Patrick J. Smith, Snoqualmie, WA (US); Suraj T. Poozhiyil, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1158 days.

(21) Appl. No.: 11/385,139

(22) Filed: Mar. 20, 2006

Related U.S. Application Data (63) Continuation-in-part of application No. 11/225,706, filed on Sep. 12, 2005.

(51) Int. Cl.
*H04L 9/32* (2006.01)
*G06F 21/00* (2006.01)

(52) U.S. Cl. .......................... 713/176; 713/187

(58) Field of Classification Search .................. 713/176, 713/181
See application file for complete search history.

(56) References Cited

U.S. PATENT DOCUMENTS

| | | | |
|---|---|---|---|
| 7,453 A | 6/1850 | Culbertson et al. | |
| 5,047,930 A | 9/1991 | Martens et al. | |
| 5,455,941 A | 10/1995 | Okuno et al. | |
| 5,623,600 A | 4/1997 | Ji et al. | |
| 5,689,565 A | 11/1997 | Spies et al. | |
| 5,694,569 A * | 12/1997 | Fischer | 711/216 |
| 5,748,960 A | 5/1998 | Fischer | 719/316 |
| 5,951,698 A | 9/1999 | Chen et al. | |
| 5,956,481 A | 9/1999 | Walsh et al. | |
| 6,006,034 A * | 12/1999 | Heath et al. | 717/170 |
| 6,367,012 B1 | 4/2002 | Atkinson et al. | |
| 6,434,103 B1 | 8/2002 | Shitara et al. | |
| 6,557,054 B2 | 4/2003 | Reisman | |
| 6,577,920 B1 | 6/2003 | Hypponen et al. | |
| 6,748,538 B1 | 6/2004 | Chan et al. | |
| 6,789,156 B1 | 9/2004 | Waldspurger | 711/6 |
| 6,796,489 B2 | 9/2004 | Slater et al. | |
| 6,799,206 B1 | 9/2004 | Workman et al. | 709/223 |
| 6,848,048 B1 | 1/2005 | Holmes | |
| 6,873,988 B2 | 3/2005 | Herrmann et al. | |
| 6,959,382 B1 | 10/2005 | Kinnis et al. | |
| 7,028,184 B2 * | 4/2006 | Hind et al. | 713/170 |
| 7,055,175 B1 | 5/2006 | Le Pennec et al. | |
| 7,093,135 B1 | 8/2006 | Radatti et al. | |
| 7,188,186 B1 | 3/2007 | Meyer et al. | |
| 7,191,407 B1 | 3/2007 | Kluttz et al. | |
| 7,203,959 B2 * | 4/2007 | Nachenberg et al. | 726/22 |

(Continued)

FOREIGN PATENT DOCUMENTS

EP 1 408 393 4/2004

OTHER PUBLICATIONS

"Applied Cryptography: Protocols, Algorithms, and Source Code in C" by Bruce Schneier, John Wiley & Sons, 1996, p. 30.*

(Continued)

*Primary Examiner* — Gilberto Barron, Jr.
*Assistant Examiner* — David Le
(74) *Attorney, Agent, or Firm* — Merchant & Gould (57) ABSTRACT

Generating a digital signature of an entire embedded code project while maintaining certain exclusion areas so that a productivity application can incorporate application-specific information into the embedded code project without hampering the digital signature.

7 Claims, 7 Drawing Sheets

U.S. PATENT DOCUMENTS

| | | | |
|---|---|---|---|
| 7,210,041 B1 | 4/2007 | Gryaznov et al. | |
| 7,216,232 B1 | 5/2007 | Cox et al. | |
| 7,269,733 B1 | 9/2007 | O'Toole, Jr. | |
| 7,290,252 B2 | 10/2007 | Diedrich et al. | 717/145 |
| 7,308,567 B2 | 12/2007 | Yamamoto et al. | |
| 7,434,058 B2 | 10/2008 | Ahuja et al. | |
| 7,453,472 B2 | 11/2008 | Goede et al. | |
| 7,814,328 B1 | 10/2010 | Leonard et al. | |
| 2001/0010720 A1* | 8/2001 | Kimball et al. | 380/241 |
| 2001/0034839 A1 | 10/2001 | Karjoth et al. | 713/190 |
| 2002/0002703 A1* | 1/2002 | Baentsch et al. | 717/11 |
| 2002/0004902 A1* | 1/2002 | Toh et al. | 713/170 |
| 2002/0007453 A1 | 1/2002 | Nemovicher | |
| 2002/0013910 A1 | 1/2002 | Edery et al. | |
| 2002/0023221 A1 | 2/2002 | Miyazaki et al. | |
| 2002/0087564 A1 | 7/2002 | Khanna et al. | |
| 2002/0087596 A1 | 7/2002 | Lewontin | |
| 2002/0099671 A1 | 7/2002 | Crosbie et al. | |
| 2002/0112083 A1 | 8/2002 | Joshi et al. | |
| 2002/0112161 A1* | 8/2002 | Thomas et al. | 713/176 |
| 2002/0129257 A1 | 9/2002 | Parmelee et al. | |
| 2002/0129277 A1 | 9/2002 | Caccavale | |
| 2002/0170052 A1* | 11/2002 | Radatti | 717/171 |
| 2003/0009533 A1 | 1/2003 | Shuster | |
| 2003/0056102 A1 | 3/2003 | Aho et al. | |
| 2003/0088790 A1 | 5/2003 | Kaler et al. | 713/201 |
| 2003/0145213 A1 | 7/2003 | Carbone | |
| 2003/0149581 A1* | 8/2003 | Chaudhri et al. | 705/1 |
| 2003/0212893 A1 | 11/2003 | Hind et al. | |
| 2003/0221105 A1 | 11/2003 | Bajaj | |
| 2004/0039912 A1 | 2/2004 | Borrowman et al. | |
| 2004/0193543 A1 | 9/2004 | Nord et al. | |
| 2005/0005101 A1 | 1/2005 | Yenduri | |
| 2005/0039018 A1 | 2/2005 | Wittkotter | |
| 2005/0050044 A1 | 3/2005 | Takagi et al. | |
| 2005/0055686 A1* | 3/2005 | Buban et al. | 717/170 |
| 2005/0063545 A1 | 3/2005 | Fujimoto et al. | 380/277 |
| 2005/0086469 A1 | 4/2005 | Dunagan | 713/163 |
| 2005/0131917 A1 | 6/2005 | Auerbach | |
| 2005/0172339 A1 | 8/2005 | Costea et al. | |
| 2006/0015940 A1 | 1/2006 | Zamir et al. | |
| 2006/0079333 A1 | 4/2006 | Morrow et al. | |
| 2006/0095971 A1 | 5/2006 | Costea et al. | |
| 2006/0143600 A1* | 6/2006 | Cottrell et al. | 717/168 |
| 2006/0167902 A1 | 7/2006 | Bhattacharyay et al. | |
| 2006/0206718 A1 | 9/2006 | Frank et al. | 713/182 |
| 2006/0271597 A1 | 11/2006 | Boske | |
| 2007/0094710 A1 | 4/2007 | Walker et al. | |
| 2007/0204165 A1 | 8/2007 | Lytle et al. | |
| 2007/0208943 A1 | 9/2007 | Gupta et al. | |
| 2008/0120710 A1 | 5/2008 | Holz et al. | |
| 2008/0128492 A1 | 6/2008 | Roth et al. | |
| 2009/0057421 A1 | 5/2009 | Suorsa et al. | |

OTHER PUBLICATIONS

Office Action mailed Aug. 4, 2009 in U.S. Appl. No. 11/225,706, pp. 1-14.
Office Action mailed Nov. 18, 2009 in U.S. Appl. No. 11/225,706, pp. 1-15.
Office Action mailed Apr. 2, 2009 in U.S. Appl. No. 11/364,403, pp. 1-20.
Office Action mailed Apr. 10, 2009 in U.S. Appl. No. 11/363,585, pp. 1-12.
Office Action mailed Oct. 15, 2009 in U.S. Appl. No. 11,364,403, pp. 1-24.
Office Action mailed Nov. 9, 2009 in U.S. Appl. No. 11/363,585, pp. 1-11.
Office Action mailed Feb. 5, 2010 in U.S. Appl. No. 11/364,403, pp. 1-32.
Office Action mailed May 18, 2010 in U.S. Appl. No. 11/363,585, pp. 1-14.
Office Action mailed Jul. 26, 2010 in U.S. Appl. No. 11/364,403, pp. 1-28.
Office Action mailed Dec. 8, 2010 in U.S. Appl. No. 11/363,585, pp. 1-14.
Office Action mailed Jan. 12, 2011 in U.S. Appl. No. 11/364,403, pp. 1-29.
Office Action mailed Apr. 15, 2011 in U.S. Appl. No. 11/363,585, pp. 1-14.
Office Action mailed Jul. 6, 2011 in U.S. Appl. No. 11/364,403, pp. 1-26.

* cited by examiner

DIGITAL SIGNATURES FOR EMBEDDED CODE

RELATED APPLICATIONS

The present application is a continuation-in-part of U.S. patent application Ser. No. 11/225,706, filed Sep. 12, 2005, and claims the benefit of the earlier filing date under 35U.S.C. §120. The parent application is hereby referenced by incorporation.

BACKGROUND

Computing systems today are becoming more and more complex. In the past, computing systems may have included productivity applications such as a word processor and a spreadsheet program whose functions were simply to create text documents and compute numbers. Today those same productivity applications include complex features, such as embedded programming environments. In other words, productivity applications today may include the ability to embed executable code within the documents themselves. This embedded code enables the features of the productivity application to be programmatically manipulated.

Many sophisticated users employ software developers to write or develop custom software programs (e.g., 'macros') within these embedded programming environments. For example, a company may employ developers to write customized software that executes in conjunction with a productivity application, such as a word processor, that is used enterprise-wide. The customized software may include functionality to assist the users with their ordinary tasks or to automate some of those tasks.

Such customized software creates an opportunity for malicious code or viruses to be introduced into a user's document. For example an outsider could receive an e-mail with a document having embedded code that is malicious. For these reasons, safe-software practices need to be applied to this embedded code. For example, code-signing is a common method of ensuring that a software program has not been modified since it was signed. Many companies take advantage of code signing for any customized software that they develop. Commonly, productivity software that allows customized embedded code to be developed includes the ability to sign their embedded code.

As applications develop and new versions are released, new features and capabilities are often included. Unfortunately, this creates a dilemma with signed embedded code in documents that are shared between users of different versions of the same application. Older versions of an application are unable to verify a signature for features that exist only in newer versions of the application. An adequate solution to this dilemma has eluded those skilled in the art, until now.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to aspects of various described embodiments, implementations are provided for a technique for generating a digital signature of an embedded code project where the embedded code project may be modified by different versions of an application. Briefly stated, data from different versions of an application are each used to generate separate representative components, such as hashes of the data. Those separate components are aggregated into an aggregated representative component. That aggregated representative component, which may be essentially an aggregated hash, is used as the basis for a digital signature of the embedded content. The signature is embedded in the document.

DETAILED DESCRIPTION

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

What follows is a detailed description of various embodiments. Briefly stated, in one embodiment a technique allows two different versions of a productivity application to share a document that includes signed embedded code even though the two versions may have different capabilities regarding the embedded code. A security manager in the productivity application is responsible for signing and verifying the signatures of the embedded code within documents used by the various versions of the application. The security manager is configured to create a digital signature for the entire embedded code, while honoring certain extended areas of the embedded code that are version specific.

Figure 1:
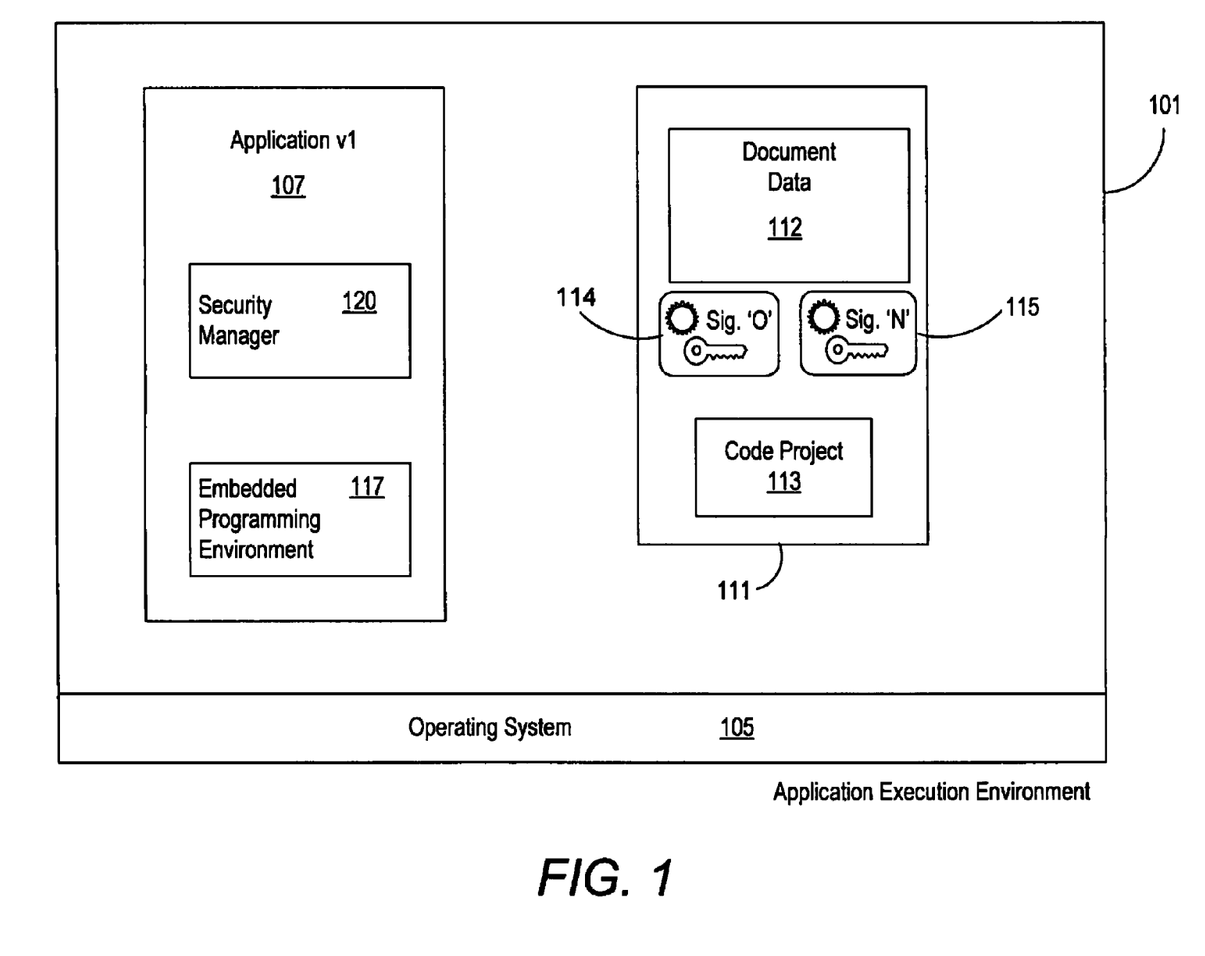
FIG. 1 is a functional block diagram of an application execution, according to one embodiment.

FIG. 1 is a functional block diagram of an application execution environment 101, according to one embodiment. The application execution environment 101 may be implemented in any conventional computing system. The application execution environment 101 may be a system memory in which software programs reside and/or execute. An operating system 105 resides and executes in the application execution environment 101 to control the hardware of the host computing device and any other software programs executing in the application execution environment 101.

In this implementation, a productivity software program resides and executes in the application execution environment 101. Application v1 107 represents one particular version of the productivity software program, of which there may be several. The application v1 107 may be any application that loads or saves files, such as a database program, a word processing program, a spreadsheet program, a presentation creation program, a drawing program, or the like. In some scenarios, one application can load a file (e.g., a viewer) and another can save the file. The application v1 107 is used to create, modify, and otherwise maintain documents, such as document 111.

The application v1 107, in this embodiment, includes an embedded programming environment 117 and a security manager 120. The embedded programming environment 117 is a tool used to create, maintain, compile, and execute customized code (and scriptable code in some embodiments) that may be stored (embedded) within the application's documents. The embedded programming environment 117 may be used to create embedded code, such as macros, to automate features or functionality of the application v1 107. In other embodiments, the code may be stored in a file outside of the document and, for example, referenced by the document.

Figure 3:
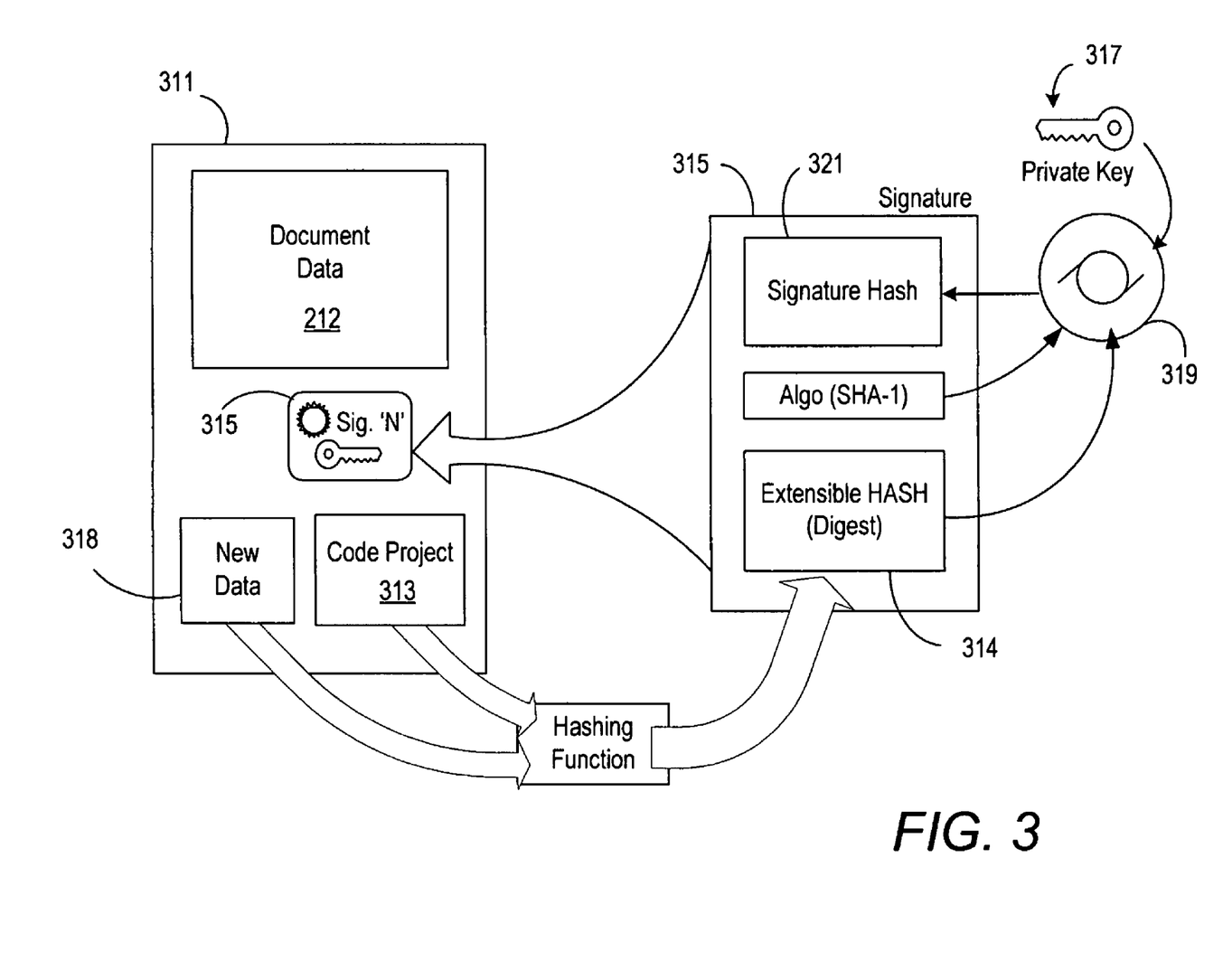
FIG. 3 is a functional block diagram generally illustrating a document including embedded code signed in accordance with one embodiment.

The security manager 120 is another component of the application v1 107 and is used to ensure that code executed by the embedded programming environment 117 is secure. The security manager 120 may be configured to digitally sign and to verify digital signatures of embedded code. In addition, the security manager 120 is specifically configured to detect and respect signed embedded code (or other features) that may exist in the document 111 and which is associated with a later version of the application v1 107. One particular technique that may be employed by the security manager 120 is illustrated in FIG. 3 and described below.

As mentioned, the application v1 107 is one of several different versions of the productivity software program, and one or more other versions may also be installed at any one time on any one computing device. Accordingly, the security manager 120 and the embedded programming environment 117 of this version of the application v1 107 may operate differently in some respects than their counterparts in earlier or later versions. In some embodiments, the same programming environment component can be used to address multiple versions of the application with a singe library. The decision on which "mode" to run in is made by the application 107, which in the case of legacy or prior versions, could be a passive decision to run in the old mode. Certain techniques may be used to maintain backwards compatibility, as developed more fully below.

The document 111 may be any form of computer-readable data that is used by the application v1 107. In accordance with this implementation, the document 111 includes document data 112, which may be any form of data that is used or manipulated by the application v1 107 under control of the user. For example, if the application v1 107 is a database program, the document data 112 may comprise records, tables, text, equations, or other similar information.

In this scenario the document 111 also includes a code project 113, which is embedded executable code to automate or otherwise programmatically access functionality of the application v1 107. Note that in some scenarios the file could be saved and loaded without the code project 113. In some embodiments, the code project 113 may include non-programmatic items such as a database query string. The code project 113 may be created and maintained in part or as a whole by the embedded programming environment 117 or the application 107. The code project 113 may include several different components, such as source code, compiled code modules (including graphical items such as forms that can display a user interface to a user), meta information defining the code project 113, and the like.

In some embodiments, the document data 112 is not signed (i.e., the code project 113 is signed but not the data 112). For example, it is frequently desirable for other users besides just the signer to be able to modify the document data 112 without breaking the digital signature 115 for the code project 113. In such an embodiment, the application v1 107 allows edits to be made to the document data 112 without modifying the code project 113. If the modifications to the document data 112 cause a change(s) to the code project 113 that may change the execution behavior, then the digital signature 115 is invalidated.

Figure 2:
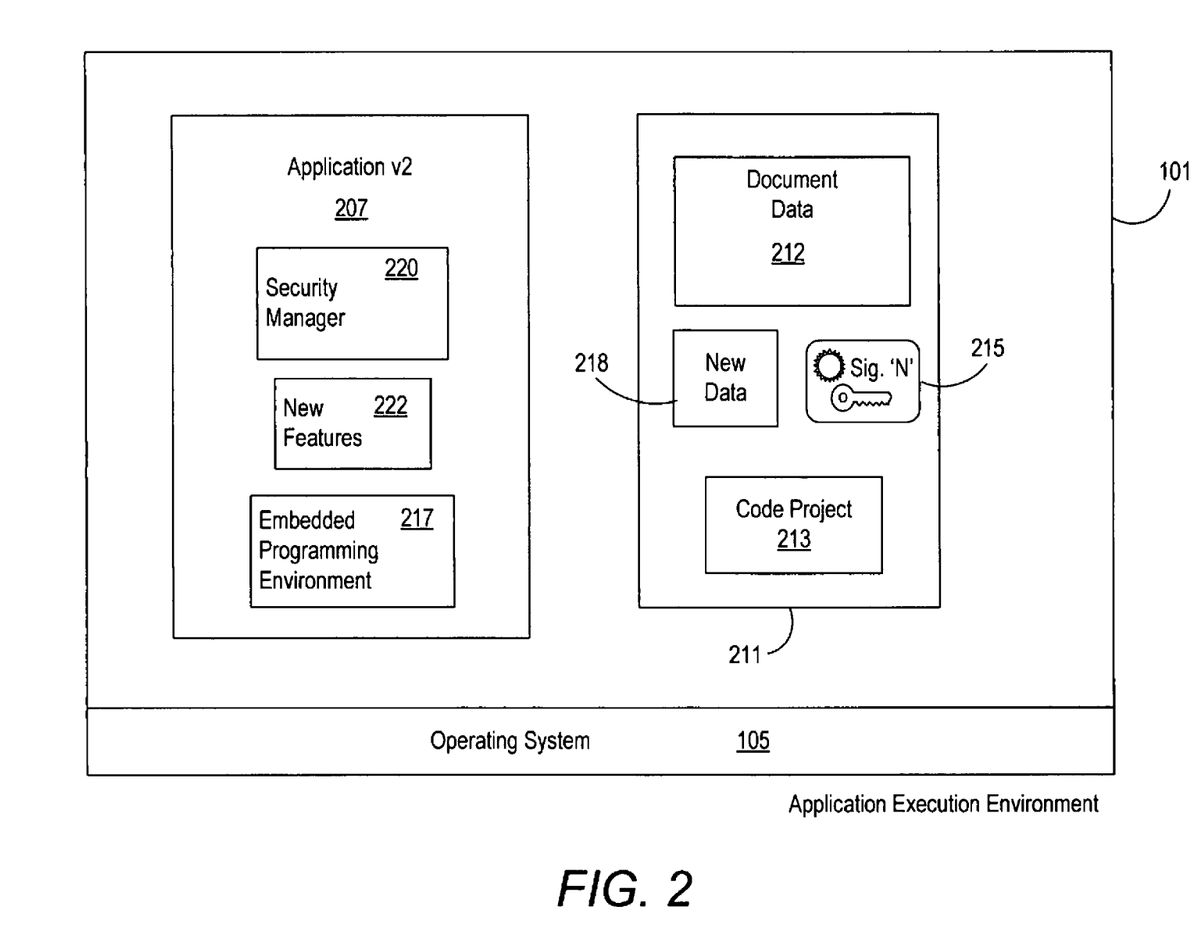
FIG. 2 is a functional block diagram illustrating another version of the productivity software program introduced in conjunction with FIG. 1.

FIG. 2 is a functional block diagram illustrating another version (application v2 207) of the productivity software program introduced above in conjunction with FIG. 1. In this example, the application v2 207 includes the functionality that was present in earlier versions (e.g., application v1 107), and includes additional functionality. More specifically, the application v2 207 includes new features 222 that were either not present in earlier versions of the program or that have changed significantly since earlier versions. Importantly, the new features 222 enable the application v2 207 to create new data 218 that can be embedded within the document 215. In other words, the new features 222 enable the creation of data or code (e.g., new data 218) that is not meaningful to earlier versions of the application (i.e., application v1 107, FIG. 1). For the purposes of this discussion, it is more clear to illustrate the new data 218 as a component embedded separately from the code project 213 within the document 215. Although separate data is possible, it should be appreciated that the new data 218 could constitute additional code or data included wholly or partially within the code project 213. The new data 218 is illustrated as conceptually separate for simplicity of discussion only.

As will be described more fully next, the security manager 220 is configured to handle the new data 218 in such a manner that the digital signature 215 will be meaningful to both the older version of the program (e.g., application v1 107) and newer versions of the program (e.g., application v2 207 and later versions). And conversely, the security manager 220 is configured to create the digital signature 215 in such a manner that the later versions of the program (e.g., application v2 207) will be able to verify the integrity of the new data 218 even if an older version of the program altered and re-signed the code project 213. In addition, and perhaps more importantly, an older version of a program (e.g., application v1 107) can still verify the integrity of a code project (e.g., code project 213) embedded within a document created with a newer version of the program (e.g., application v2 207) even if the document includes signed code or data that the older version does not understand (e.g., new data 218).

FIG. 3 is a functional block diagram generally illustrating a document 311 including embedded code signed in accordance with one embodiment. According to embodiments, an extensible hash includes several portions. The version of the application will know about some of them and not others. It is assumed that an application cannot read the data in a document that it does not recognize, and therefore that data poses no security threat. A particular version of the application is aware of which hashes are relevant and generates the hashes. The application recomputes the hashes for only those hashes of the data that the application is aware of. Then a security manager takes the hashes not generated by the application (the irrelevant ones) and merges them with the hashes generated by the application in order to determine validity.

As shown in FIG. 3, the document 311 includes document data 312 and an embedded code project 313 as described earlier. In some embodiments, a user or developer may create or modify the code project 313 in conjunction with or separate from creating or modifying the document 311. As mentioned above, in some embodiments an embedded programming environment 117 (FIG. 1) is used to create, edit, maintain, and execute the code project 313. In other embodiments, the document 311 could be constructed without using the application, and thus the embedded programming environment. For example, a user could create the project in one file, strip it from that file and embed it in the document 311.

In addition, as discussed above, the document 311 could also include new data 318, which represents data created using new features of a recent version of an application. For simplicity of discussion only, the new data 318 will be referred to simply as "data" although those skilled in the art should appreciate that the new data 318 could be any type of computer-readable information and is not limited to any particular type of data. In other words, the term "data" should be understood to include not only traditional data, but also executable code, source code, markup language instructions, partially compiled code, data structures, and the like.

Moreover, although only one instance of new data 318 is illustrated in FIG. 3 and discussed here, it will become apparent that multiple instances of "new data" could be embedded within the document 311 with each instance being associated with a different version of the application. And again, as discussed above, the multiple instances of new data need not be physically separate from the code project 313 or even other instances of new data. Rather the separation between new data 318 and the code project 313 is merely conceptual to simplify this discussion.

To assist with security, the user may choose to digitally sign the code project 313 so that others who use or access the document 311 will have some confidence that the code project 313 has not been altered after it was last saved by the signing party. In this implementation, the code project 313 represents that data that may be generated by features of the application that are common to at least several versions of the application. In one example, the code project 313 may represent any data that could be created using the then-most-current version of the application at the time the techniques described here are incorporated into the application and/or the security manager.

However, as the new data 318 may include data that could put the user at risk, it is also desirable to sign the new data 318. However, for the purposes of extensibility, it has been determined preferable to create a digital signature 215 that allows the new data 318 to be treated separately from the code project 313, which enables older versions of the application to continue to verify the code project 313 without regard to the new data 318 (which the older version can't understand anyway).

Figure 4:
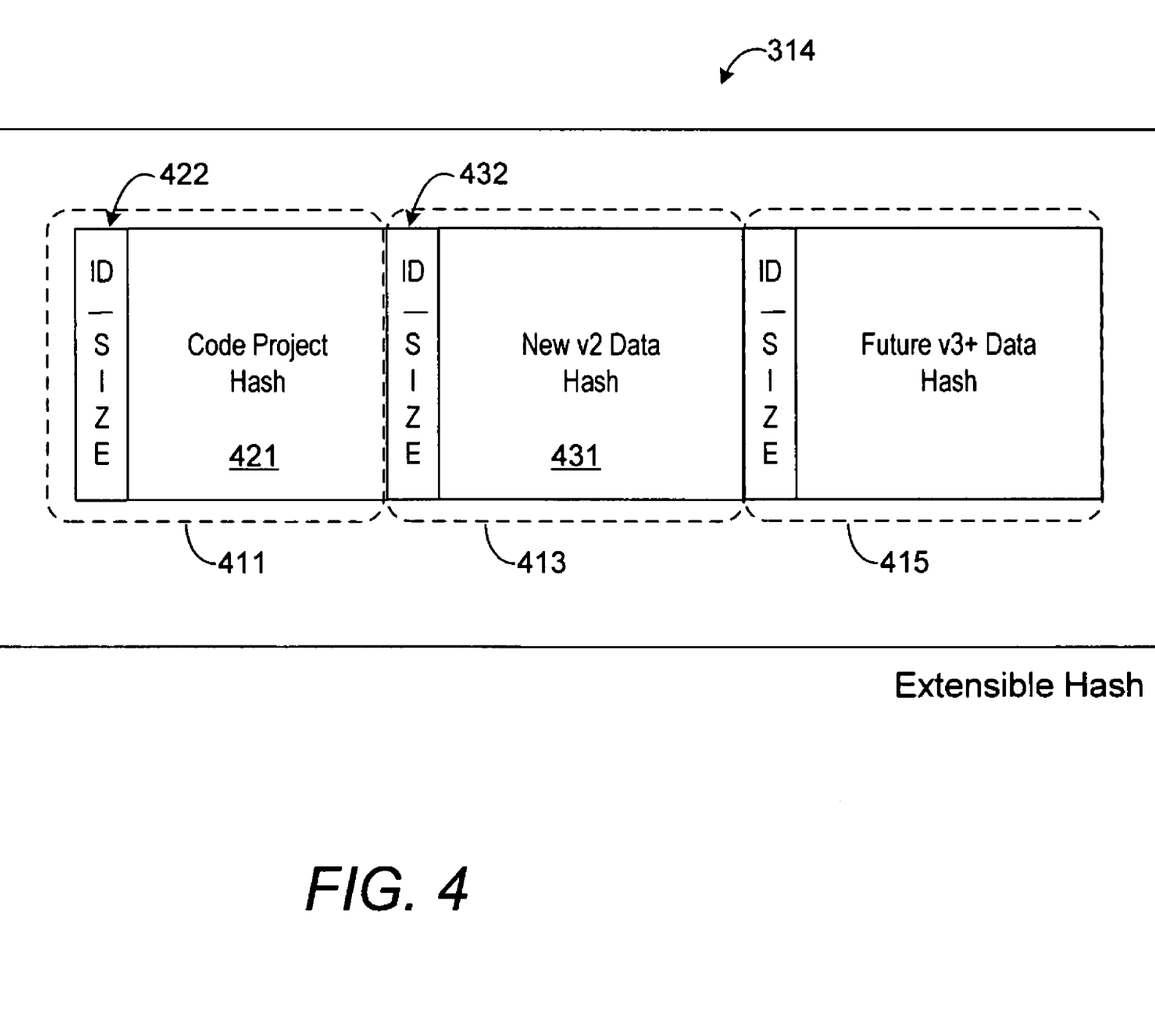
FIG. 4 is a conceptual illustration of the sample extensible hash 314 introduced in conjunction with FIG. 3.

Thus, in accordance with this implementation, an "extensible hash" 314, also termed digest, is constructed to symbolize the parts of the document 311 that are being secured, namely the code project 313 and the new data 318 in this example. One particular example format of the extensible hash 314 is illustrated in FIG. 4 and described below. Briefly stated, the extensible hash 313 is created in this particular example by generating separate hashes of the code project 113 and of the new data 318. It should be appreciated that other portions of the document 311 could also be hashed separately from the code project 313 and the new data 318, such as other new data associated with yet another version of the application. However, for simplicity of discussion, this example will describe hashing only the code project 113 and the new data 318 as if this particular document 311 includes no other data that poses a security threat. If, however, additional data is embedded in the document 311 for which signing is desired, that data can be hashed independently in as many different instances as is appropriate under the circumstances in a manner similar to how the new data 318 is being handled.

Accordingly, returning to the current example, hashing the code project 113 and the new data 318 creates the extensible hash 314, which becomes the basis for the digital signature 315. The extensible hash 314 in combination with a cryptographic key 317 are input to a particular hashing algorithm 319, such as, for example the SHA-1 hashing algorithm known in the art. Other suitable hashing algorithms can be used in other embodiments. The output of the hashing algorithm 319 is a signature hash 321, which is basically an encrypted hash of the extensible hash 314. The signature hash 321 is the information used to later verify the validity of the code project 113. The particular hashing algorithm 219 used to create the signature hash 221 may also be identified within the signature 315. When complete, the entire digital signature 315 is stored within the document 311.

To verify the validity of the information embedded in the document 311 when it is opened later, the security manager 220 (FIG. 2) recomputes the extensible hash 314 based on the information actually embedded in the document 311 at that time (to determine if it has been altered since it was signed). This may include computing individual hashes for sub-portions of the document 311 (e.g., code project 313 and new data 318) that have been signed by the signature 315. A verification digest (not shown) of those individual hashes is then recomputed in combination with a public key that corresponds with the private key 317. If the verification digest matches the signature hash 321 in the signature 315, then the individual sub-portions have not been modified since being signed. In addition, as described above, an older version of the application could modify the code project 313 without impacting the new data 318 and re-sign the applicable portions of the document 311 in accordance with the technique described above without altering the hash of the new data 318. In this way, a newer version of the application (e.g., application v2 207) can continue to verify the integrity of its new data 318 even though the older version of the application (application v1 107) could not compute a hash of the new data 318.

As discussed, the security manager, when requested, creates the digital signature 315 of information or data embedded in the document 311. To do so, the security manager may first serialize certain data within the document 311 into a flat data stream that may be hashed using a hashing algorithm.

FIG. 4 is a conceptual illustration of the sample extensible hash 314 introduced in conjunction with FIG. 3. As mentioned, the extensible hash 314 forms the basis for the actual digital signature that is generated to secure the embedded data (e.g., code project 313 and new data 318) within the document 311 (FIG. 3). As noted above, the extensible hash 314 is constructed by aggregating separate hashes of different portions of data. The extensible hash 314 includes an initial section 411 with a hash 421, which may be a hash of the code project described above. Accordingly, the initial section 411 may represent so much of the embedded data that is common to multiple versions of an application. The initial section 411 also includes other information 422, such as an identifier (ID) for that section, a size of the hash 421, and perhaps other information.

In this particular example, the extensible hash 314 also includes a new v2 data section 413 that includes a hash 431 of any new data associated with a "version 2" of the application. The term "version 2" does not necessarily mean that the second version of the application was used to generate the new data as it could be any version of the application, including, for the sake of completeness, the same version as was used to create the code project itself. However, in many implementations it is expected that the new v2 data hash will be associated with new data that is not meaningful to a different version of the application, such as an older version. The second section 413 also includes additional information 432, such as an ID of the section and a size of its hash 431.

As can be seen, as new features are added to an application, data or information generated by those features can be signed in a meaningful manner by appending a new section to the extensible hash 314. In this example, a third or later version of the application can simply append its unique data to the extensible hash (e.g., future v3+ data hash 441) as it becomes available without preventing each prior version from continuing to be able to verify the data. This enables an extensible mechanism for signing embedded data that supports multiple versions of an application sharing the same data, as will be understood by those skilled in the art.

According to some embodiments, a separate hash is provided for the properties of a particular version of an application. This way, different versions of the application may be able to open, save, and roundtrip past, present, and future versions of the document. However, past versions of the application should not be able to look at or modify a future version's properties. The extensible hash structure to accomplish these goals is described above.

Figure 5:
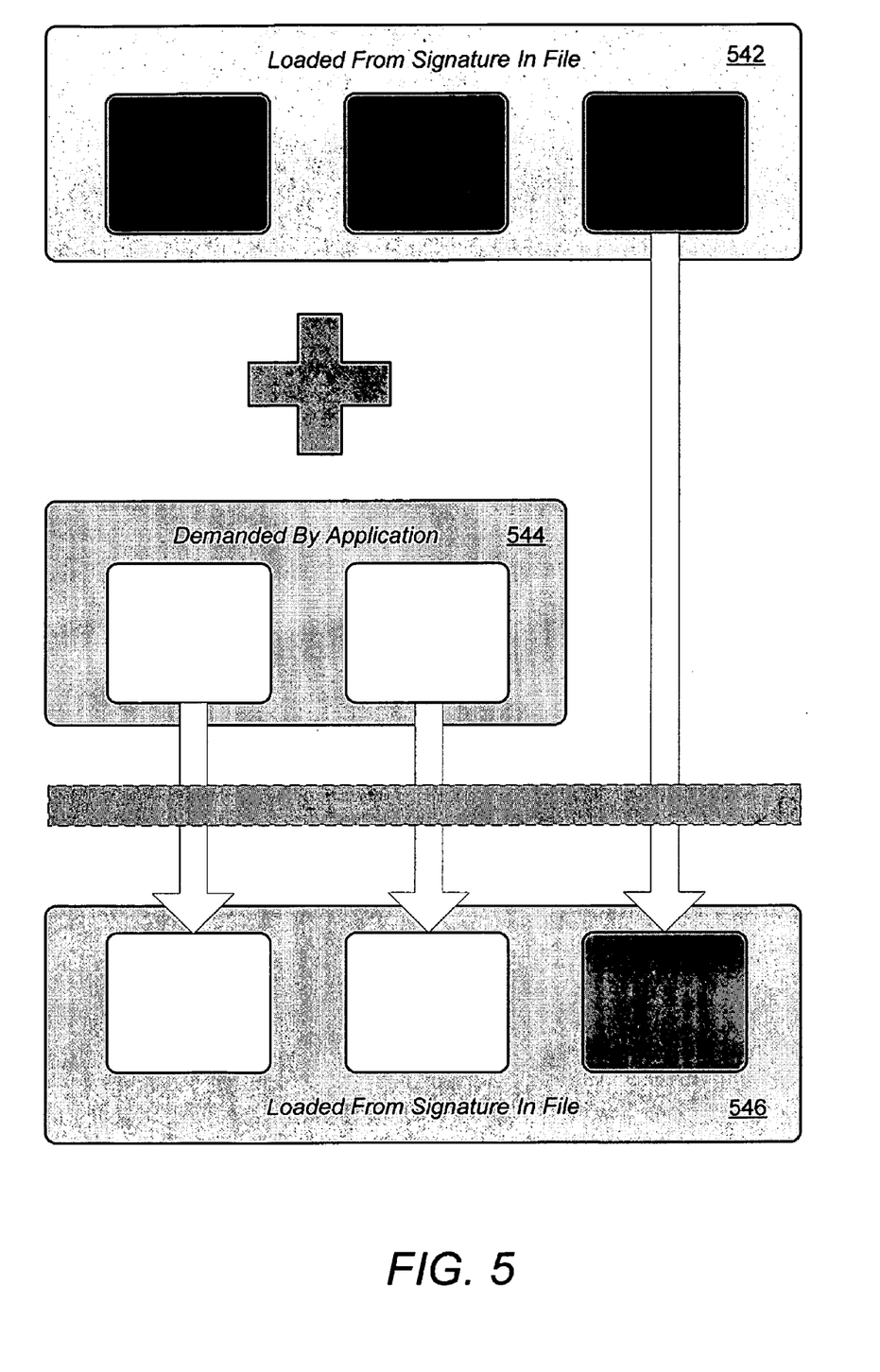
FIG. 5 is a conceptual illustration of an example extensible hash implementation in an application with three versions, according to one embodiment.

FIG. 5 illustrates an example use of an extensible hash structure according to embodiments. During signing and verification, the signature information from the signature (540) in the document is loaded and used as a basis for calculating a signature blob. Since the data is contained in the signature 542 of the document, the data is automatically hashed by the signature. Therefore, if any of the data is tampered with, the signature 542 itself fails.

Then, using the hashes provided by the application (Demanded By Application 544), the data in the copy of the document hashes is replaced by the hashes computed from the document. The application determines this by looking at the verifiable data in the document. If any hash is requested to be present in the document, and it is not present in the signature already, the operation fails again.

Accordingly, the final version of "Loaded from Signature in File" (546) is used to verify against the actual contents signature. This portion of data has already been signed in the file by the signature hash. The third element in "Loaded from Signature in File" (546) is computed from data that the loading application does not know about and/or modify between saves.

Figure 6:
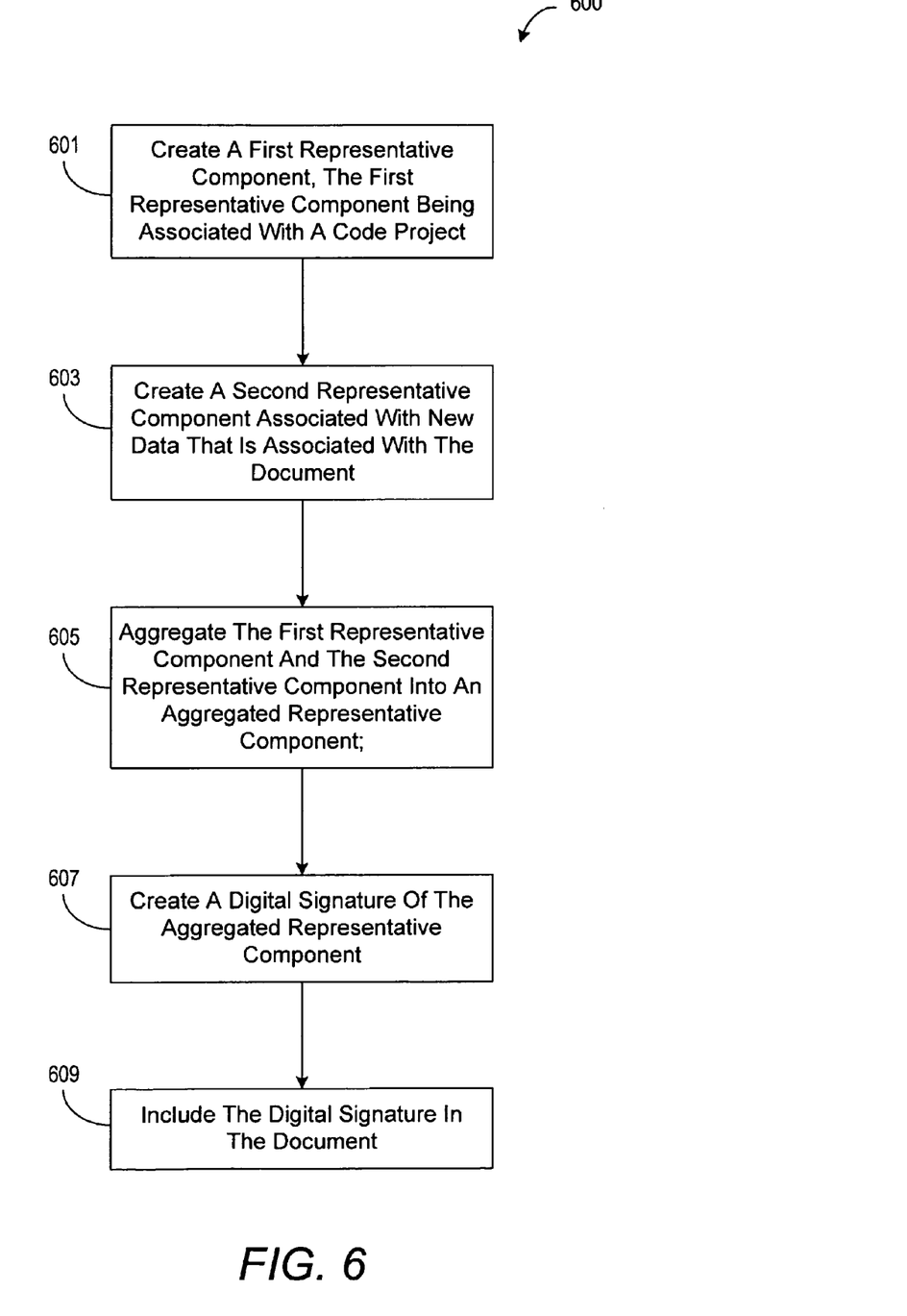
FIG. 6 illustrates an operational flow for digitally signing embedded data that includes portions compatible with different versions of an application, according to one embodiment.

FIG. 6 illustrates an operational flow 600 for digitally signing embedded data that includes portions compatible with different versions of an application. In one example, the operational flow 600 may be implemented by a security manager component that is responsible for signing embedded code. The method begins when a document that includes embedded data is ready for signing.

At block 601 a first representative component is created. The first representative component is associated with a code project, and the code project is associated with a document created by an application. In one example, the code project is embedded within the document. The application has different versions, and at least one version has new features that differ from another version of the application.

At block 603, a second representative component is created. The second representative component is associated with new data that is associated with the document. The new data corresponds to the new features of the at least one version of the application.

At block 605, the first representative component and the second representative component are aggregated into an aggregated representative component. In one example, the first and second representative components are hashes of data, and the aggregated representative component includes the hashes of data. The aggregated representative component could include additional information.

At block 607, a digital signature of the aggregated representative component is created. In one example, the digital signature may be created by processing the aggregated representative component in combination with a cryptographic key using a hashing function. Alternative examples are also possible.

At block 609, the digital signature is included in the document. In one example, the digital signature is embedded in the document in combination with the other embedded data.

Although operational flow 600 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 7:
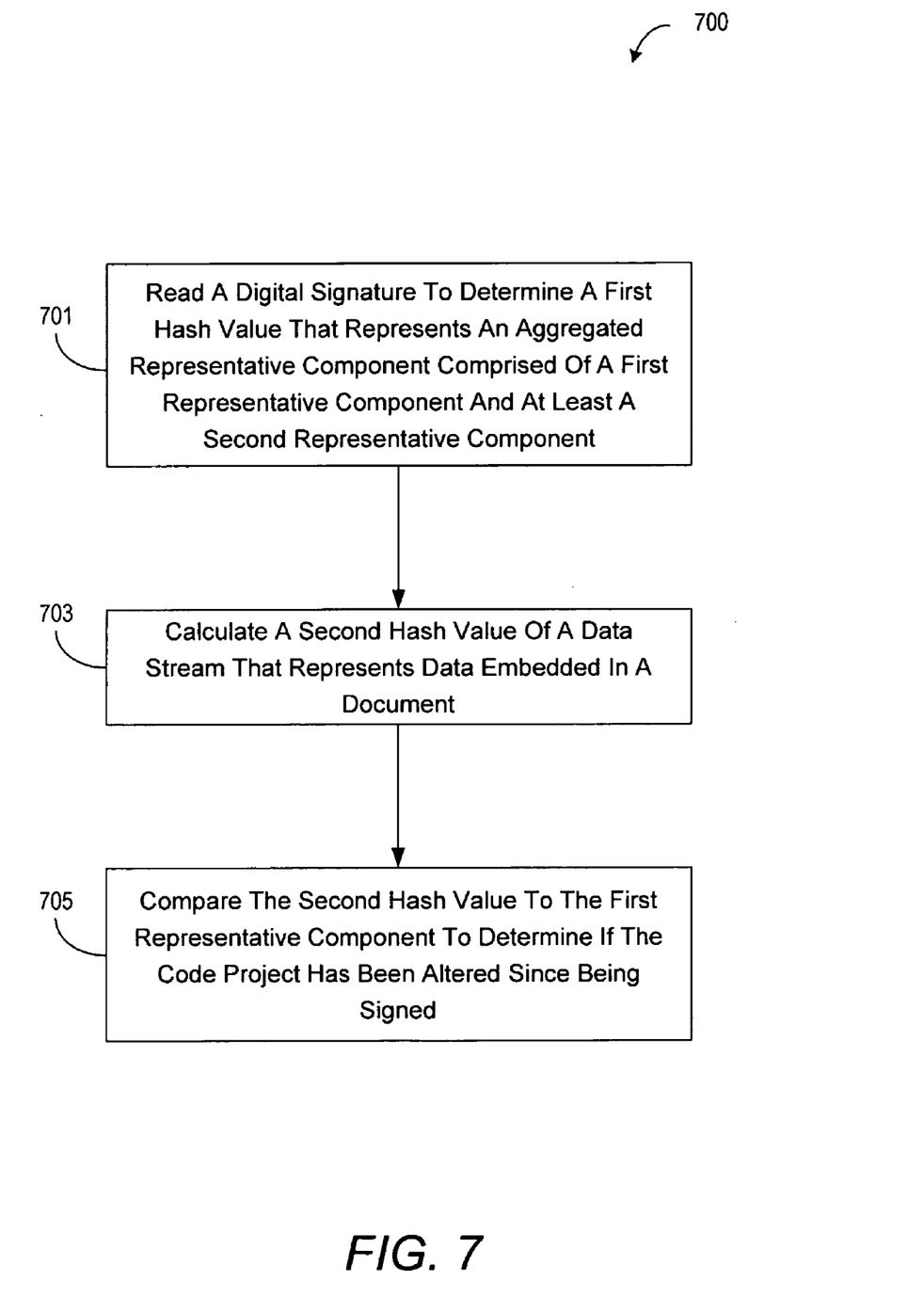
FIG. 7 illustrates an exemplary operational flow for verifying the signature of embedded code that includes new data, according to one embodiment.

FIG. 7 illustrates an exemplary operational flow 700 for verifying the signature of embedded code that includes new data. In one example, operational flow 700 may be implemented by a security manager component that is responsible for verifying digital signatures. The operational flow 700 begins when a document including embedded data and a digital signature are received.

Operational flow 700 begins at a block 701, where a digital signature embedded in a document is read to verify data embedded in the document. A method for verifying a digital signature, comprising:

At block 701, a digital signature is read to determine a first hash value, the first hash value representing an aggregated representative component that includes a first representative component and at least a second representative component. The first representative component is associated with data common to plural versions of an application. The second representative component is associated with data related to features of a later version of the application.

At block 703, a second hash value is calculated of a data stream that represents data embedded in a document. In one example, the data embedded in the document represents new data corresponding to the features of the later version of the application. In another example, the data embedded in the document represents the data common to plural versions of the application. In still another example, the data stream includes both the new data and the common data.

In yet another example, the data stream may include elements of the first hash stream if the application does not include hashes to represent that particular component. This way the application does not need knowledge of "new components" in order to generate a matching second hash.

At block 705, the second hash value is compared to the first representative component to determine if the data embedded in the document has been altered since being signed. In one example, the comparison reveals whether the data common to plural versions of the application has been altered. In another example, the comparison reveals whether the new data has been altered. In still another example, the comparison reveals whether either the common data or the new data has been altered.

Although operational flow 700 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A method for verifying a digital signature, comprising:
    reading a digital signature embedded in a document to verify data embedded in the document, wherein reading the digital signature comprises determining a hash value representing an aggregated representative component, the aggregated representative component including at least a first representative component and at least a second representative component, the first representative component being associated with data common to an application used for creating the document and a later version of the application;
    calculating a hash value of a data stream representing the data embedded in the document, the data embedded in the document representing the data common to the application; and
    comparing the hash value of the data stream to the hash value representing the aggregated representative component to determine whether the data common to the application used for creating the document and the later version of the application has been altered.

2. The method recited in claim 1, wherein the new data includes a portion having computer-executable instructions.

3. A method for verifying a digital signature, comprising:
    reading a digital signature to determine a hash value representing an aggregated representative component including at least a first representative component, the first representative component being associated with data common to plural versions of an application, the plural versions of the application comprising a current version of an application used for creating a document comprising the data and a later version of the application, wherein a portion of the data common to the plural versions of the application comprises a code project comprising embedded executable code to programmatically access functionality of the current version of the application, the code project further comprising at least one of a database query string, forms for displaying a user interface to a user, and meta information defining the code project;
    calculating a hash value of a data stream representing embedded code in the document, the embedded code in the document representing the data common to the plural versions of the application; and
    comparing the hash value of the data stream to the hash value representing the aggregated representative component to determine whether the data common to the plural versions of the application has been altered.

4. The method recited in claim 3, wherein the code project includes a portion having computer-executable instructions.

5. The method recited in claim 3, wherein the new data includes a portion having computer-executable instructions.

6. The method recited in claim 1, wherein a portion of the data common to the plural versions of the application comprises a code project comprising embedded executable code to programmatically access functionality of a current version of the application, the code project further comprising at least one of a database query string, forms for displaying a user interface to a user, and meta information defining the code project, wherein a portion of the data common to the plural versions of the application is related to the features of the later version of the application and comprises the new data.

7. The method recited in claim 6, wherein the code project includes a portion having computer-executable instructions.

* * * * *